United States Patent [19]
Barr

[11] Patent Number: 5,254,373
[45] Date of Patent: Oct. 19, 1993

[54] PROCESS OF MAKING THIN FILM MAGNETIC HEAD

[75] Inventor: Ronald A. Barr, Mountain View, Calif.

[73] Assignee: Read-Rite Corp., Milpitas, Calif.

[21] Appl. No.: 47,497

[22] Filed: Apr. 19, 1993

[51] Int. Cl.$^5$ .............................................. B05D 5/12
[52] U.S. Cl. ..................................... 427/498; 427/130; 427/131; 427/132; 427/259; 427/265; 427/282; 427/385.5; 427/504; 427/552
[58] Field of Search ............... 427/498, 504, 552, 130, 427/132, 131, 259, 265, 282, 385.5

Primary Examiner—Bernard Pianalto
Attorney, Agent, or Firm—Nathan N. Kallman

[57] ABSTRACT

The second pole layer P2 of a thin film transducer structure is fabricated by using two levels of photoresist to define the pattern of the P2 pole layer. The first photoresist layer is deposited as a thin film and is used to focus an optical projection device that projects the mask pattern onto the photoresist. After etching and curing of the first photoresist, which is disposed above a portion of the first pole piece at the apex of the transducer, a second photoresist layer is deposited over the first photoresist layer and above the insulation deposited over the electrical coil structure. The second photoresist layer is relatively thick and serves to define the frame for printing the P2 pole piece pattern a second time. The data track width defined by the P2 pole piece is more uniform as a result of the improved definition of the frame used for registering the P2 pattern.

7 Claims, 1 Drawing Sheet

PROCESS OF MAKING THIN FILM MAGNETIC HEAD

FIELD OF THE INVENTION

This invention relates to the manufacture of thin film magnetic heads and in particular to the process of defining the magnetic pole layer during fabrication of a thin film inductive head.

DESCRIPTION OF THE PRIOR ART

Thin film magnetic transducers or heads are used extensively in data processing systems, such as disk drives, for recording and reading data signals which are registered on a magnetic medium, such as a magnetic disk. Thin film magnetic heads typically comprise upper and lower magnetic pole layers or pole pieces, designated as P1 and P2, and an electrically conductive coil structure disposed between the magnetic layers or pole pieces. The tips of the P1 and P2 pole pieces define a transducing gap for coaction with a magnetic disk that rotates close to the transducing gap of the head. The pole pieces interconnect at a back closure. A polished ceramic substrate having a thin insulation layer thereon, which is lapped and polished, supports the different layers which are deposited to form the magnetic transducer. To prevent electrical shorting, insulating layers are provided between the coils and the pole pieces.

To fabricate the P2 pole piece layer, photolithography using patterned masks are employed. A mask with a desired printed pattern is positioned over the transducer structure. An optical projection apparatus with a focusing element is adjusted to delineate the pattern to be printed and developed on a photoresist which is deposited over insulation covering the conductive coil and P1 layer. Precise control of the thickness of the single coat photoresist that is spin coated over the insulation has been found to be difficult, particularly in the throat region of the thin film transducer, where the P1 and P2 layers narrow and the pole tips form the transducing gap. If the insulation is relatively thick, the photoresist tends to be thin. Since the stepper of the projection apparatus has a limited focusing range, it is a problem to focus and frame the thin photoresist area in the throat region. Thus distortion is produced between the photoresist and insulation patterns which affects control of the uniformity of the P2 pole piece width and thus the width of the recorded data track, which is defined by the width of the P2 pole tip.

SUMMARY OF THE INVENTION

An object of this invention is to provide a process for controlling the shaping of the P2 pole piece of a thin film head.

Another object of this invention is to provide a process for controlling data track width defined by the P2 pole piece.

According to this invention, during the fabrication of a thin film head incorporating first and second Permalloy pole layers P1 and P2 respectively, the second pole layer P2 is formed using two levels of photoresist to define the P2 pattern. The first photoresist layer is deposited as a thin film over a portion of the P1 layer at the apex of the head. The apex is defined as the curved region of insulation that begins at about the outermost turn of the uppermost portion of the coil structure and ends at the zero throat height of the head, which is the region where the insulation ends and the transducing gap begins between the P1 and P2 pole layers. The first level of photoresist is used for focusing the optical system that projects the mask onto the photoresist. After patterning and curing the first photoresist, a second thick layer of photoresist is deposited and flows so that a gradual joinder of the first and second levels of photoresist is achieved. The P2 pole pattern is printed a second time with an optimal focus to define the P2 pole precisely.

BRIEF DESCRIPTION OF THE DRAWINGS

The invention will be described in greater detail with reference to the drawings in which.

Similar numerals refer to similar elements throughout the drawing.

DETAILED DESCRIPTION OF THE INVENTION

Figure 1:
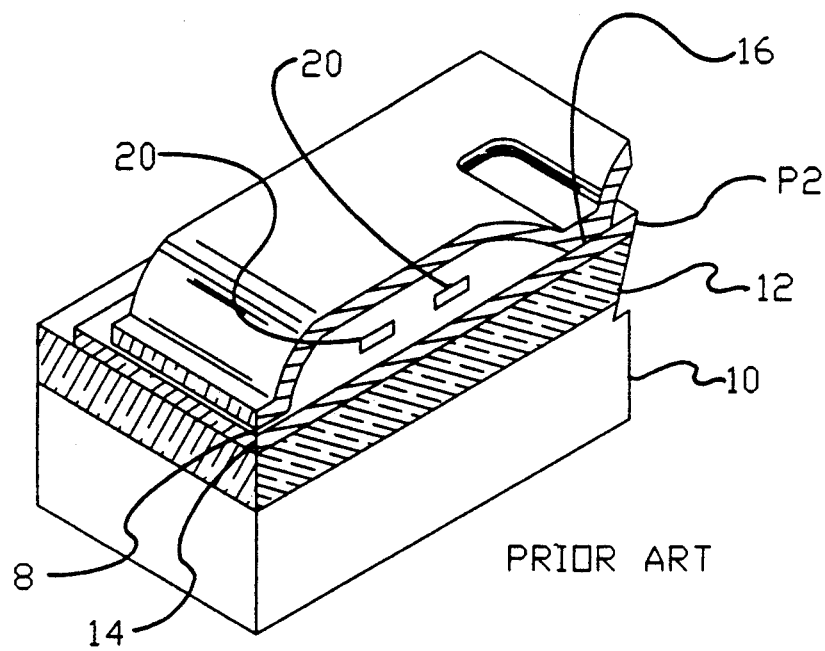
FIG. 1 is a cross-sectional view of a thin film head assembly, as known in the prior art.

As presently known, during manufacture of a thin film magnetic transducer, a ceramic substrate 10, preferably made of a material formed from a mixture of aluminum oxide ($Al_2O_3$) and titanium carbide (TiC), is polished to provide a smooth surface on which a layer of insulating alumina or aluminum oxide 12 is deposited by r.f. (radio frequency) sputtering, for example, as depicted in FIG. 1. The insulating oxide layer 12 is lapped and polished to eliminate surface defects. First and second pole piece layers, designated as P1 and P2 respectively are deposited to form the magnetic yoke and magnetic circuit with a transducing gap. Both pole pieces are preferably made of Permalloy material. The P1 pole piece and second pole piece P2, which is spaced above P1 and in virtual alignment with P1, provide a magnetic field between the pole pieces.

During manufacture of the thin film magnetic transducers, the first pole piece P1 is deposited by r.f. sputtering over the insulating layer 12. The pattern of the P1 pole piece is formed by means of a mask using standard photolithographic processes. After deposition of the P1 pole piece, a thin film of sputtered aluminum oxide is deposited over the entire surface of the P1 layer. The portion of the oxide film in the area of the back closure 16 of the transducer is removed by standard masking and etching. The remaining thin oxide film, which extends to the tips of the P1 and P2 pole pieces, provides the transducing gap 14 at the transducing surface of the thin film head. After forming the pole piece P1 and depositing the oxide film for defining the transducing gap 14, an insulation layer 18 is laid down. An electrical coil structure 20 with a number of turns, preferably made of copper material, is then deposited. The electrical coil structure 20, which is located between the pole pieces P1 and P2, conducts current within the magnetic field generated by the P1 and P2 pole pieces. Additional insulation is deposited over the coil 20 to prevent electrical shorting. The insulation layers, which are interleaved between the P1 and P2 pole pieces and encompasses the coil 20, are made of organic photoresist that is baked and hardened. An insulating aluminum oxide overcoat layer (not shown) is r.f. sputtered over the entire thin film head structure to protect against deleterious ambient effects, such as humidity for example.

Figure 2:
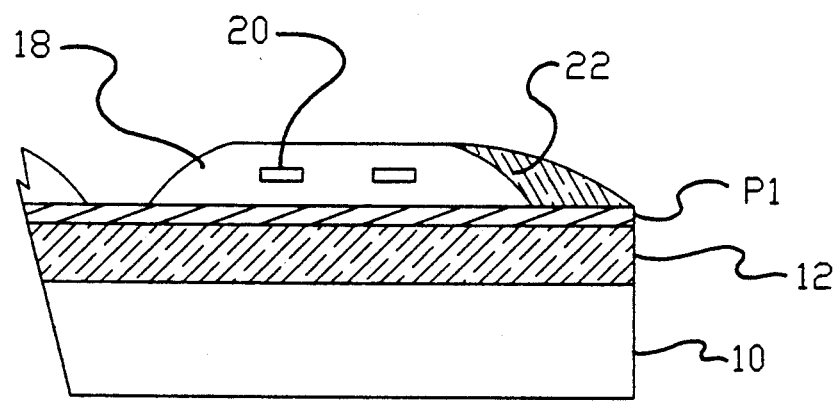
FIG. 2 is a cross-sectional view, partly broken away, illustrating the formation of a first level pattern of photoresist for developing the P2 pole layer.

In accordance with this invention, the fabrication of the P2 pole piece is implemented with first and second levels or photoresist layers. The first photoresist layer defines only a portion of the P2 pole layer to be formed and the second photoresist layer defines the final P2 pole layer precisely. During production, a first layer of photoresist 22 is spin coated over insulation 18 surrounding the coil structure 20 and over a portion of the P1 pole piece at about the apex of the head. The material used for the photoresist 22 may be, by way of example, AZ 4000 Series, semiconductor grade, which has a low viscosity such as 30 centipoise. The photoresist 22 is deposited at a low spin speed, such as 800 rpm (revolutions per minute) for about 10 seconds, by way of example. During the spin coating, the photoresist 22 flows and is thinned as it moves across the insulation 18 towards the apex region 24 of the transducer structure. The low viscosity of the photoresist 22 avoids unwanted drift of the material which may cause undesirable thickening of the photoresist 22 at the throat region of the thin film transducer. The photoresist 22 is patterned by the use of a mask and optical projection apparatus, and then etched using well known photolithographic techniques. The thin photoresist layer 22 is cured by electron beam application, and not by thermal curing which is commonly used. The resultant formation 22a of the photoresist 22, illustrated in FIG. 2, includes a very thin layer portion over the insulation 18 and a relatively thick portion that covers the apex region 24 including the P1 section in the apex region of the thin film transducer structure.

Figure 3:
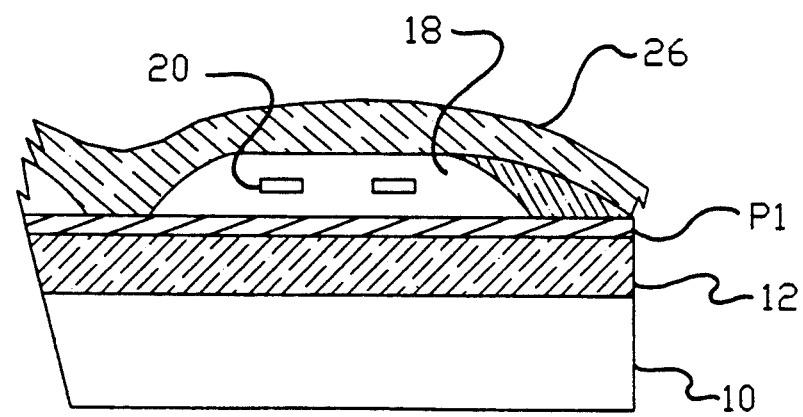
FIG. 3 is a cross-sectional view, partly broken away, illustrating the formation of a second level pattern of photoresist for producing the P2 pole layer.

With reference to FIG. 3, a second level or layer of photoresist 26 is spin coated over the hardened first photoresist layer 22. The material of the second photoresist layer 26 has a high viscosity, and is deposited to form a thick layer over the first level resist layer 22. The second photoresist material 26 is spin coated over the insulation 18. The pattern of the P2 pole piece is again printed and formed using the adjustable focus of the optical projection apparatus to define the frame of the P2 pattern so as to match the P2 window frame area with that of the P1 frame area. A modified mask is used to define the P2 window frame area and to expose the resist in the pole tip area of the thin film transducer. The P2 pole piece layer is then deposited over the two layers of photoresist 22 and 26 which define the pattern of the P2 layer. A protective overcoat layer is then deposited over the P2 layer and the thin film structure. Wiring to the electrical coil is provided for connection to external circuitry, as is well known in the art.

There has been described herein a novel process for fabricating a thin film transducer, particularly the formation of the second pole piece layer designated as P2. Two levels of photoresist are used for defining the total P2 pattern. The two photoresist patterns are joined gradually as a result of the thinning of the first resist layer 22 as it coats the apex of the thin film head. This approach to forming the photoresist pattern for defining the P2 pole layer prevents a sharp dislocation between the two levels of photoresist layers, which would result if the two photoresist layers were patterned separately and then butted together. In this way, the definition of the frame obtained with optical focusing techniques to register the P2 pattern is significantly improved.

It should be understood that the invention is not limited to the materials and parameters set forth above. For, example, other photoresist materials may be used having the desired viscosity. Other techniques for curing the photoresist may be used. The spin coating process may be varied in rpm or spin time and the thicknesses of the deposited photoresist may be varied. The coil structure may be made with one or more layers. Other variations may be made within the scope of this invention.

What is claimed is:

1. A process for making a thin film transducer having first and second spaced magnetic pole piece layers and an electrical coil structure between said layers, said magnetic layers forming a magnetic yoke and defining a transducing gap, comprising the steps of:
    depositing a first pole piece layer on a substrate;
    depositing a first layer of insulation material over said first pole piece layer;
    depositing an electrical coil structure over said first layer of insulation material;
    depositing a second layer of insulation material above said electrical coil structure;
    depositing a first thin layer of photoresist over said second layer of insulation material and over a portion of said first pole piece layer;
    forming a pattern to define at least a portion of said second pole layer;
    depositing a second thick layer of photoresist over said first thin layer of photoresist for precisely defining the pattern of said second pole layer;
    depositing said second pole piece layer over said second thick layer of photoresist.

2. A process as in claim 1, wherein said steps of depositing said first and second layers of photoresist comprises the step of spin coating said photoresist layers.

3. A process as in claim 2, wherein the step of spin coating said first photoresist layer is accomplished at a spin speed of about 800 rpm.

4. A process as in claim 3, wherein said step of spin coating said first photoresist layer is accomplished in about 10 seconds.

5. A process as in claim 1, including the steps of framing the pattern of said second pole layer by masking said first photoresist layer and then framing the pattern of said second pole layer again by masking said second photoresist layer.

6. A process as in claim 5, wherein said steps of framing comprises focusing a mask pattern by optical projection and by adjusting said focusing.

7. A process as in claim 1, including the steps of curing said photoresist layers by electron beam application.

* * * * *